United States Patent
Nisar et al.

(10) Patent No.: US 7,680,128 B2
(45) Date of Patent: Mar. 16, 2010

(54) METHOD AND APPARATUS FOR INTERFACING APPLICATIONS TO LCAS FOR EFFICIENT SONET TRAFFIC FLOW CONTROL

(75) Inventors: Bhavesh Nisar, Alpharetta, GA (US); Qin Wan, Alpharetta, GA (US); Ping Pan, San Jose, CA (US); Hon Tat Ho, Sunnyvale, CA (US); Raghu Arja, Cupertino, CA (US)

(73) Assignee: Ciena Corporation, Linthicum, MD (US)

( * ) Notice: Subject to any disclaimer, the term of this patent is extended or adjusted under 35 U.S.C. 154(b) by 1271 days.

(21) Appl. No.: 11/184,171

(22) Filed: Jul. 19, 2005

(65) Prior Publication Data

US 2006/0018324 A1    Jan. 26, 2006

Related U.S. Application Data

(60) Provisional application No. 60/589,004, filed on Jul. 20, 2004.

(51) Int. Cl.
    H04L 12/56 (2006.01)
(52) U.S. Cl. .................. 370/395.51; 370/401; 370/235; 370/395.54; 370/907; 370/412
(58) Field of Classification Search .................. 370/235, 370/393, 230, 294, 434, 252, 468, 400, 395.32, 370/907, 395.54, 539
See application file for complete search history.

(56) References Cited

U.S. PATENT DOCUMENTS 7,492,714 B1 * 2/2009 Liao et al. .................. 370/235
2004/0120362 A1 * 6/2004 Chohan et al. .............. 370/907

(Continued)

OTHER PUBLICATIONS

Paul Bonenfant et al., Generic Framing Procedure (GFP): The Catalyst for Efficient Data over Transport, May 2002, IEEE Communications Magazine, pp. 72-79.*
Jones, Nevin et al., A Proposed Link Capacity Adjustment Scheme (LCAS) for SONET Virtually Concatenated SPEs, Oct. 9-13, 2000, Lucent Technologies, T1X1.5/200-199, pp. 1-30.*

*Primary Examiner*—Dang T Ton
*Assistant Examiner*—Mohamed Kamara
(74) *Attorney, Agent, or Firm*—Clements Bernard PLLC; Christopher L. Bernard; Tyler S. Brown

(57) ABSTRACT

The present invention provides methods and apparatuses for interfacing high-layer applications to Link Capacity Adjustment Scheme (LCAS) on Synchronous Optical Network/Synchronous Digital Hierarchy (SONET/SDH) edge nodes. These applications include high-level control protocols, such as Generalized Multiprotocol Label Switching (GMPLS) and Optical Switching and Routing Protocol (OSRP), and user-initiated cross-connect creation and termination. The present invention provides a mechanism that is capable of mapping SONET/SDH connections to Virtual Concatenated Groups (VCGs), thus enabling an efficient interface for operators to control and manage the connections via LCAS. As part of the mechanism, the existing LCAS protocol state machine is enhanced such that the operators can shut down bi-directional SONET/SDH flows from a single edge node, as opposed to from both source and sink nodes, as provided for by existing specifications.

25 Claims, 3 Drawing Sheets

U.S. PATENT DOCUMENTS

| | | | |
|---|---|---|---|
| 2005/0073955 A1* | 4/2005 | MacLean et al. | 370/235 |
| 2005/0078685 A1* | 4/2005 | MacLean et al. | 370/395.54 |
| 2005/0135435 A1* | 6/2005 | Ishii | 370/539 |
| 2005/0147121 A1* | 7/2005 | Burrell et al. | 370/468 |
| 2005/0157736 A1* | 7/2005 | Hamlin et al. | 370/412 |
| 2005/0276223 A1* | 12/2005 | Maggi et al. | 370/235 |
| 2005/0281197 A1* | 12/2005 | Honda | 370/235 |
| 2006/0013133 A1* | 1/2006 | Peng et al. | 370/230 |

* cited by examiner

METHOD AND APPARATUS FOR INTERFACING APPLICATIONS TO LCAS FOR EFFICIENT SONET TRAFFIC FLOW CONTROL

CROSS-REFERENCE TO RELATED APPLICATION(S)

The present non-provisional patent application claims the benefit of priority of U.S. Provisional Patent Application No. 60/589,004, filed Jul. 20, 2004, and entitled "A METHOD AND APPARATUS FOR INTERFACING APPLICATIONS TO LCAS FOR EFFICIENT SONET TRAFFIC FLOW CONTROL," which is herein incorporated in full by reference.

FIELD OF THE INVENTION

The present invention relates generally to the optical networking field. More specifically, the present invention relates to a method and apparatus for interfacing applications to Link Capacity Adjustment Scheme (LCAS) for efficient Synchronous Optical Network/Synchronous Digital Hierarchy (SONET/SDH) traffic flow control.

BACKGROUND OF THE INVENTION

In recent years, Ethernet over SONET/SDH (EoS) has become a popular solution for carriers to transport data packets over long-haul Wide-Area Networks (WANs). This solution has been driven by a number of factors, including compatibility issues and pricing concerns. EoS allows for the utilization of already built and deployed SONET/SDH transport infrastructures and facilities, as well as operations, administration, and maintenance (OAM) features. For equivalent bandwidth, the per-interface price for Gigabit Ethernet (GigE) is approximately one quarter that of Time Division Multiplexing (TDM) (Packet-Over-SONET (POS)) interfaces.

One common misperception in this area has been that, by equipping a transport network element with an Ethernet interface card, the carriers would perform traditional layer-2 functions. While this may be the case in metro networks, this approach presents network management problems as service providers and customers typically use different tools and processes to manage their layer-2 and layer-1 networks and functions. Currently, for most carriers, Ethernet interfaces, including Fast Ethernet (100 Mb/s), Gigabit, and 10-Gigabit Ethernet interfaces, serve as cost-effective layer-1 alternatives for upgrading customers' bandwidth.

Traditionally, SONET/SDH transport networks have been known for their ready availability and high reliability. These transport networks are typically deployed for voice traffic transport. With recent advancements in SONET/SDH technology, including Generic Framing Procedure (GFP), Virtual Concatenation (VCAT), and LCAS, it is possible, via the methods and apparatuses of the present invention, that EoS transport data packets can achieve this same level of availability and reliability, and in a bandwidth-efficient manner.

BRIEF SUMMARY OF THE INVENTION

In various exemplary embodiments, the present invention provides methods and apparatuses for interfacing high-layer applications to LCAS on SONET/SDH edge nodes. These applications include high-level control protocols, such as Generalized Multiprotocol Label Switching (GMPLS) and Optical Switching and Routing Protocol (OSRP), and user-initiated cross-connect creation and termination. The present invention provides a mechanism that is capable of mapping SONET/SDH connections to Virtual Concatenated Groups (VCGs), thus enabling an efficient interface for operators to control and manage the connections via LCAS. As part of the mechanism, the existing LCAS protocol state machine is enhanced such that the operators can shut down bi-directional SONET/SDH flows from a single edge node, as opposed to from both source and sink nodes, as provided for by existing specifications.

In one exemplary embodiment, the present invention provides a method for interfacing high-layer applications to a Link Capacity Adjustment Scheme (LCAS) signaling protocol on Synchronous Optical Network/Synchronous Digital Hierarchy (SONET/SDH) edge nodes for efficient traffic flow control, the method including: encapsulating packet payloads into SONET/SDH containers using a Generic Framing Procedure (GFP) protocol; dividing the SONET/SDH containers into Virtual Containers (VCs) that are part of a Virtual Concatenated Groups (VCG) using a Virtual Concatenation (VCAT) protocol; hitlessly, dynamically, and selectively adding/removing members to/from the VCG using the LCAS signaling protocol; monitoring the operational condition of and selectively assigning a state to time-slots associated with the VCG and one or more diverse routes using a Time-Slot Manager; and providing an interface for users to specify the VCG in terms of time-slots and communicating time-slot changes between the Time-Slot Manager and the LCAS signaling protocol using a VCG Manager.

In another exemplary embodiment, the present invention provides a method for interfacing high-layer applications to a Link Capacity Adjustment Scheme (LCAS) signaling protocol on Synchronous Optical Network/Synchronous Digital Hierarchy (SONET/SDH) edge nodes for efficient traffic flow control, the method including: encapsulating packet payloads into SONET/SDH containers using a Generic Framing Procedure (GFP) protocol; dividing the SONET/SDH containers into Virtual Containers (VCs) that are part of a Virtual Concatenated Groups (VCG) using a Virtual Concatenation (VCAT) protocol; hitlessly, dynamically, and selectively adding/removing members to/from the VCG using the LCAS signaling protocol; monitoring the operational condition of and selectively assigning a state to time-slots associated with the VCG and one or more diverse routes using a Time-Slot Manager; providing an interface for users to specify the VCG in terms of time-slots and communicating time-slot changes between the Time-Slot Manager and the LCAS signaling protocol using a VCG Manager; generating a request to suspend traffic on selected time-slots using the application; receiving the request on the Time-Slot Manager; relaying the request to the VCG Manager; and informing the data plane to trigger the LCAS signaling protocol to shut down traffic on multiple directions.

In a further exemplary embodiment, the present invention provides an apparatus for interfacing high-layer applications to a Link Capacity Adjustment Scheme (LCAS) signaling protocol on Synchronous Optical Network/Synchronous Digital Hierarchy (SONET/SDH) edge nodes for efficient traffic flow control, the apparatus including: a Generic Framing Procedure (GFP) protocol for encapsulating packet payloads into SONET/SDH containers; a Virtual Concatenation (VCAT) protocol for dividing the SONET/SDH containers into Virtual Containers (VCs) that are part of a Virtual Concatenated Groups (VCG); the LCAS signaling protocol for hitlessly, dynamically, and selectively adding/removing members to/from the VCG; a Time-Slot manager for monitoring the operational condition of and selectively assigning a state to time-slots associated with the VCG and one or more diverse routes; and a VCG Manager for providing an interface for users to specify the VCG in terms of time-slots and communicating time-slot changes between the Time-Slot Manager and the LCAS signaling protocol.

BRIEF DESCRIPTION OF THE DRAWINGS

The present invention is illustrated and described herein with reference to various drawings, in which like reference numbers denote like method steps and/or apparatus components, and in which.

DETAILED DESCRIPTION OF THE INVENTION

Figure 1:
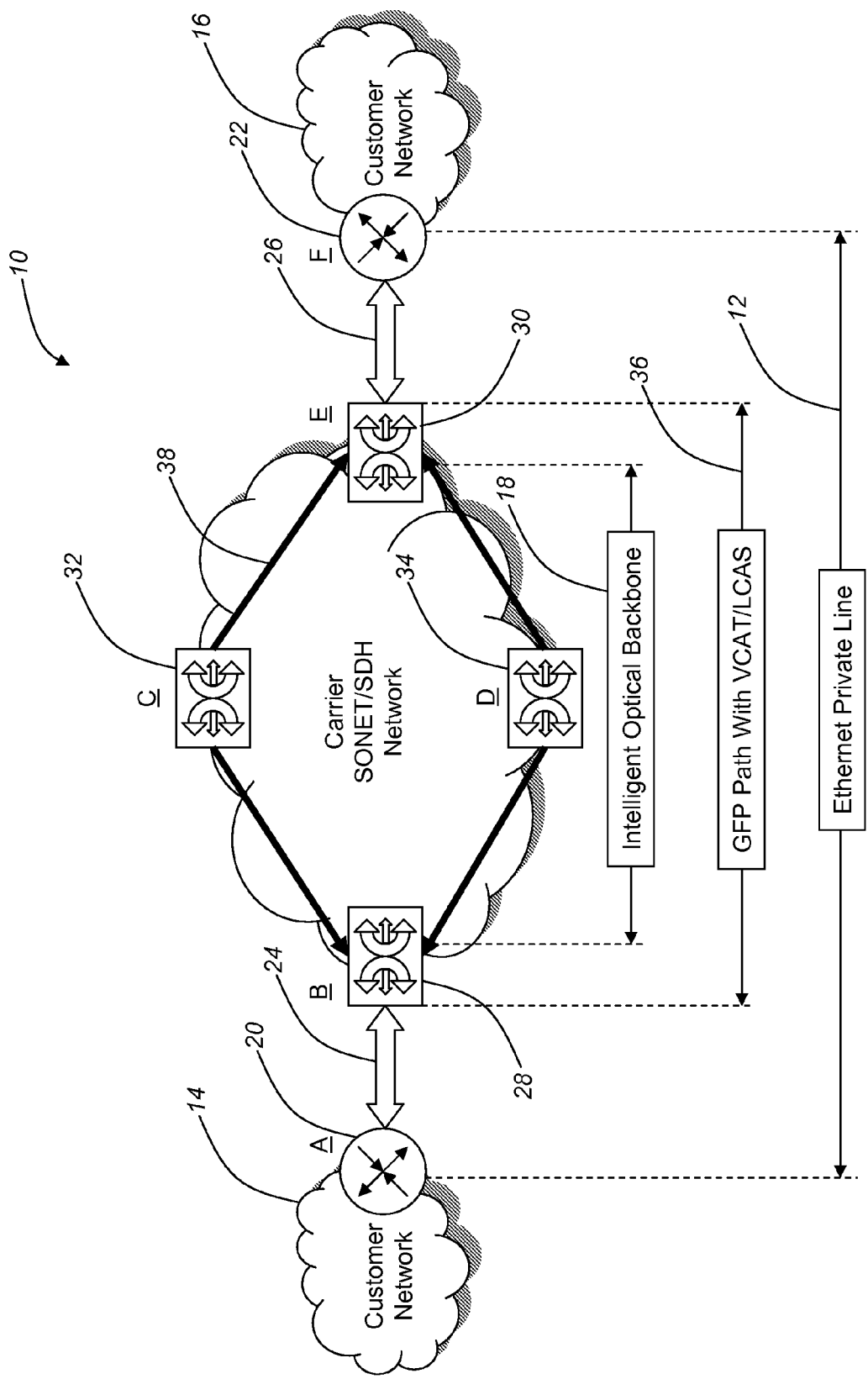
FIG. 1 is a schematic diagram illustrating a typical EoS configuration and an Ethernet tunneling operation using GFP for data packet encapsulation and VCAT/LCAS for data packet-friendly traffic delivery.

Referring to FIG. 1, a typical EoS configuration 10 is illustrated, as well as an Ethernet tunneling operation using GFP for data packet encapsulation and VCAT/LCAS for data packet-friendly traffic delivery. A point-to-point Ethernet private line 12 interconnects two customer networks 14 and 16 via a SONET/SDH backbone 18 (which may be, for example, GMPLS-enabled). Customer routers and switches A 20 and F 22 connect to the SONET/SDH backbone 18 via Ethernet interfaces 24 and 26 (such as Fast Ethernet (100 Mb/s), Gigabit, or 10-Gigabit Ethernet interfaces). At the SONET/SDH backbone edge, upon receiving data packets from customer interfaces, SONET/SDH switches B 28 and E 30 encapsulate the data packets in GFP frames, and then map the frames into pre-established VCAT/LCAS connections. At the far end of the network, the data packets are recovered and delivered to customers.

The control and management of an Ethernet connection can be divided into three parts: customer interface, network edge, and core. From customer networks' control planes, the underlying transport network is transparent. To the routers and switches A 20 and F 22 that sit at the edges of the customer networks 14 and 16, there exists a direct point-to-point connection. The functionality of the Ethernet private line 12 is not much different than a traditional TDM interface running POS. The operations of the customer and transport networks are independent of one another.

Within the transport network, SONET/SDH switches C 32 and D 34 operate in a conventional manner. This illustrates the reason behind the deployment of EoS, to leverage the widely deployed SONET/SDH infrastructure.

From the transport network edge, SONET/SDH switches B 28 and E 30 must be capable of (a) processing incoming data packets, including performing packet buffering, flow control, and GFP encapsulation, and (b) initiating, controlling, and terminating the VCAT/LCAS path 36. Both of these functionalities are new to SONET/SDH networks. Additionally, SONET/SDH switches B 28 and E 30 must interface with control protocols, such as GMPLS, to correlate cross-connects (most likely diversely routed) with the VCAT/LCAS path 36.

In general, GFP is a simple data packet encapsulation method used to adapt various data packet payloads into SONET/SDH containers. One of the most practical features of GFP is the ability to propagate client-specific management information, such as performance monitoring, or OAM, data. For example, upon failure/degradation detection on a client interface, the GFP source can send a Client Signal Fail (CSF) message to the far end GFP destination. A typical CSF message includes only a payload header with the failure type.

SONET/SDH allows bandwidth to be increased in a coarse manner. If the bandwidth of a container is insufficient, the next larger container can be allocated. When interfacing with data traffic, this method of bandwidth allocation becomes extremely inefficient. For example, in order to transport a 100 Mb/s rate Ethernet, a STS-3c must be allocated, resulting in approximately 50 Mb/s of wasted bandwidth.

In general, VCAT provides a means for creating the proper size pipes that can be transported and delivered as a unit. VCAT breaks the bandwidth into several smaller sized payload containers (such as STS-1, STS-3c, etc.) at the source node and reassembles them at the destination node to regenerate the data stream expected by the end user. As such, the logical connection desired by the end user is realized as a set of independently routed (and potentially protected) paths through the network. The individual connections can be diversely routed to achieve some degree of fault tolerance, as well as network resource optimization. A VCAT-enabled logical connection is referred to herein as a VCG. With VCAT, a 100 Mb/s data flow requires two separated STS-1 timeslots, with no wasted bandwidth.

As described above, SONET/SDH lacks flexibility to perform dynamic bandwidth allocation and, when a connection is resized, traffic is disrupted and lost. Defined as a VCAT extension, LCAS overcomes this problem with the hitless in-service addition and deletion of members to/from the VCG. The LCAS protocol performs connectivity checks continuously, and, thereby, can protect user traffic by dynamically removing failed members from the VCG when a network failure has been detected, and adding these members back as the failure has been repaired, without intervention from the operators. This important LCAS functionality allows a provider to significantly improve the resiliency offered to users by provisioning diversely routed SONET/SDH paths that belong to the same VCG.

Implementing the new features described above on a SONET/SDH switch poses a number of challenges, which ultimately determine the accuracy, efficiency, and overall performance of the associated system.

First, referring again to FIG. 1, with VCAT, the carriers can send user data traffic on diverse routes 38. However, this increases implementation difficulty. Each VCG can consist of multiple members. At the data plane, each of these members operate independently, and are managed individually. The high-layer control protocols, such as GMPLS, on the other hand, group a subset of these members to establish a single cross-connect. Thus, if and when there is a reverse route change, such as a reroute of traffic due to a network failure, the software implementation must be able to quickly identify the VCG and the affected members, and inform the data plane to trigger LCAS for traffic protection.

Second, even with an efficient high-layer control protocol interface in place, the inefficient protocol at the data plane must be overcome. In general, Ethernet private lines are managed as bi-directional flows. However, the LCAS protocol handles unidirectional flows only. This creates problems when the operators decide to reduce the bandwidth of a bi-directional private line (a VCG) by disabling some of its members. In a worst case scenario, disabling a member causes LCAS member state out-of-sync on the ingress and egress nodes, which results in traffic loss. To avoid data packet drop, the operators must first suspend data transmission on the affected members at both ingress and egress, then proceed to stop traffic on both nodes, and finally delete the members. A more efficient, and less error-prone, solution would be to enable the operators to shut down member traffic on a single node.

Third, hitless bandwidth upgrade and downgrade is the core of LCAS protocol implementation. This requirement means that, during VCG member modification, such as addition, deletion, or suspension, the user must not observe any data packet drop. This is to rely on LCAS to negotiate member availability between ingress and egress nodes prior to actual member deletion from the data plane. Implementation ties into the handling of bi-directional traffic shutdown.

As described above, SONET/SDH cross-connects, VCG, and LCAS operate on different time-slot granularities. Time-slot is a terminology used in TDM-based switches to describe bandwidth. For example, an OC-192 switch would be operating on 192 STS-1 time-slots, or 64 STS-3c time-slots.

Figure 2:
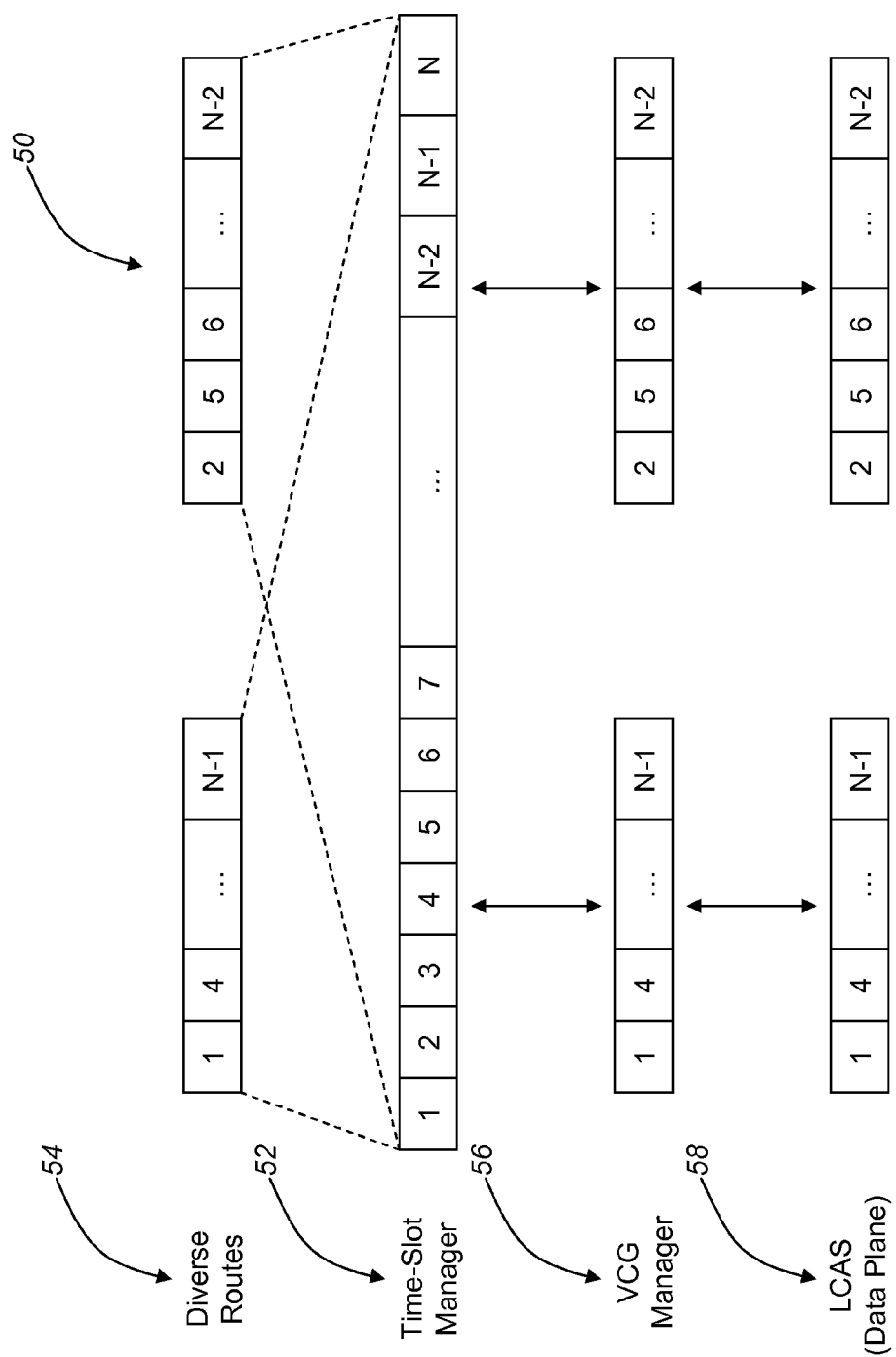
FIG. 2 is a schematic diagram illustrating the relationship among all of the variables associated with the time-slot management method of the present invention.

FIG. 2 illustrates the relationship among all of the variables associated with the time-slot management method 50 of the present invention. VCG is a set of time-slots that form a user traffic flow. Each cross-connect uses a subset of the VCG's time-slots to construct a route that may be controlled via GMPLS. Each VCG can have one or multiple cross-connects. Finally, LCAS operates on a single time-slot basis.

The following can be observed: the common denominator (or the smallest unit) is a time-slot, and VCG's and routes are nothing more than a logical combination of the time-slots. Given the flexibility in VCAT, the formation of each VCG and route contains a random number of time-slots. The only constraints are: (1) the sum of all time-slots in the routes must be the same as that in a VCG, and (2) all time-slots must have the same granularity (all STS-1's or STS-3c's).

Thus, the focus is on the management and control of time-slots only. As illustrated in FIG. 2, all time-slots of the system are managed. The Time-Slot Manager 52 is responsible for monitoring the operational condition of each time-slot, and each time-slot can be: IDLE—the time-slot has not been defined by hardware, HOLD—the time-slot is in the process of being initiated by an application, READY—the time-slot is ready to be used, or ACTIVE—the time-slot is operational and passing traffic.

The diverse routes 54 are used by the backbone-bound connections. They can be cross-connects initiated and managed by GMPLS or OSRP, or manually created permanent connections. If and when the routes 54 are initiated, the corresponding time-slots are moved to HOLD. When the routes 54 are established, the time-slots become ACTIVE. Likewise, when a route has been re-negotiated or withdrawn, the time-slots are moved to READY/ACTIVE or HOLD, respectively.

The VCG Manager 56 is responsible for two things: (a) presenting an interface for the users to specify VCGs in terms of time-slots (which, in turn, translate into the amount of bandwidth that will be available for user flows), and (b) interfacing with the Time-Slot Manager 52 and LCAS. Instead of interfacing with individual applications directly, the VCG Manager 56 works with individual time-slots. Advantageously, the VCG Manager 56 is not application dependent. The VCG Manager 56 is only concerned with the eventual state of the time-slots, and propagates each time-slot change to LCAS. For each time-slot managed with a VCG, the VCG Manager 56 maintains the following states: IDLE—the time-slot has not been initiated in the Time-Slot Manager 52 yet, HOLD—the time-slot is in process with the Time-Slot Manager 52, READY—the time-slot has been activated in the Time-Slot Manager 52 and can begin to transport data, or ACTIVE—the data plane 58 is sending data within the time-slot and LCAS is up-and-running.

When a route has been successfully established, the Time-Slot Manager 52 changes all corresponding time-slots to ACTIVE, and alerts the VCG Manager 56 of the changes. Upon receiving the alert, the VCG Manager 56 moves the corresponding time-slots to READY. Depending upon the state of the data plane 58, it will send new members to the data plane 58 for LCAS to operate, and change the time-slots to ACTIVE. If there is a failure in the data plane 58, the VCG Manager 56 will change the time-slots to READY, and wait until the data plane 58 is functional again.

To delete a route, the Time-Slot Manager 52 first passes a request to the VCG Manager 56 to inform LCAS to suspend traffic on the time-slots associated with the route. After traffic is successfully suspended on the time-slots, higher-layer protocol starts to delete the route. The Time-Slot Manager 52 informs the VCG Manager 56 of the changes, and the VCG Manager 56 will, in turn, change the corresponding time-slots to IDLE.

Managing time slots in this manner, an efficient interface between high-layer protocols and LCAS is created. However, in order to handle and process user requests at the data plane 58, the functionality of LCAS must be enhanced.

Figure 3:
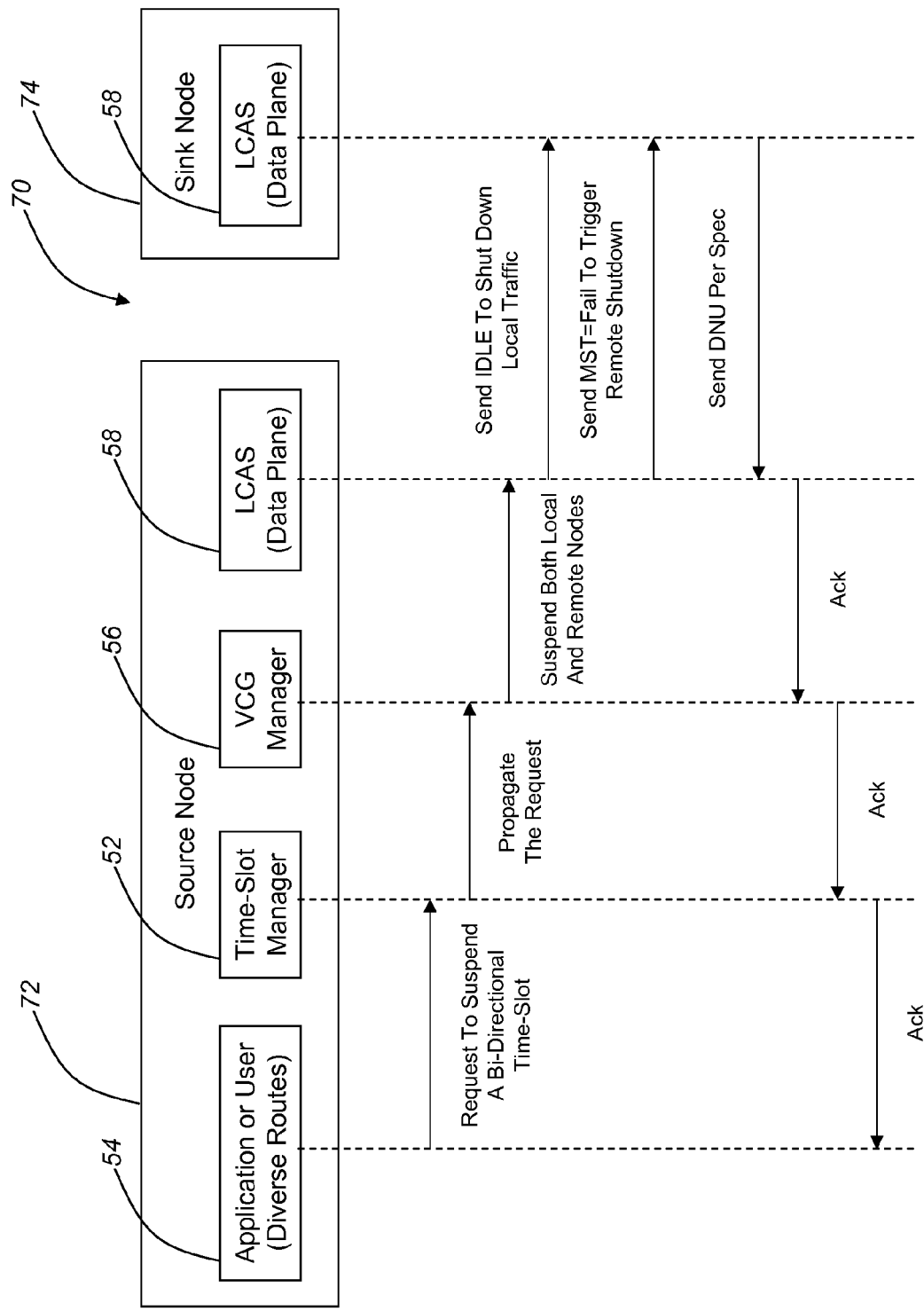
FIG. 3 is a schematic diagram illustrating the bi-directional traffic shutdown method of the present invention.

As described above, LCAS is a uni-directional protocol (triggered from source to sink), while virtually all transport network flows are bi-directional. This becomes difficult to manage as the operators begin to modify the bandwidth of an established "tunnel" by removing members from the associated VCG. To simplify the operation sequence and avoid data packet drop, the LCAS protocol is used to trigger both ends of a connection to negotiate for member deletion. This method 70 is illustrated in FIG. 3.

On a source node 72, the application, which includes GMPLS, OSRP, or any user-initiated action, generates a request to suspend data traffic on some time-slots. It should be noted that all conventional applications are designed and configured to control and manage cross-connects from the source, and only minor action is required on the part of the sink. Upon receiving the request on the Time-Slot Manager 52, the Time-Slot Manager 52 relays such request to the VCG Manager 56. The VCG Manager 56, in turn, informs the data plane 58 to trigger LCAS to shut down data traffic on both directions. Typically, the source node 72 triggers an LCAS IDLE operation to suspend data transmission, and relies on the operators to perform another LCAS IDLE operation on the sink node 74 to stop data transmission on the other direction.

After the LCAS IDLE operation, MST=Fail is sent to inform the other end that the associated time-slot is down. In other words, a time-slot outage is "Faked" from the source. By LCAS specifications, the sink node 74 reacts to an MST=Fail message by shutting down data transmission and replies with an LCAS DNU (Do Not Use) message. Thus, bi-directional shutdown has been achieved. Upon the receipt of a DNU message, the source notifies the VCG Manager 56 of the completion of the data traffic suspension and eventually the application also receives an acknowledgment.

Advantageously, the methods and apparatuses of the present invention are application-independent. Because work is performed at the time-slot level, all applications are transparent to VCG and LCAS operation. By faking a time-slot outage via LCAS, bi-directional shutdown has been achieved. Any member manipulation is driven by LCAS at the data plane, thus no data packet drop is experienced. Finally, the methods and apparatuses of the present invention are backwards compatible, as the LCAS protocol is not violated. As a result, any LCAS-capable equipment can be utilized.

Although the present invention has been illustrated and described herein with reference to preferred embodiments and examples thereof, it will be readily apparent to those of ordinary skill in the art that other embodiments and/or examples may perform similar functions and/or achieve similar results. All such equivalent embodiments and/or examples fall within the spirit and scope of the present invention and are intended to be contemplated by the following claims.

What is claimed is:

1. A method for interfacing high-layer applications to a Link Capacity Adjustment Scheme (LCAS) signaling protocol on Synchronous Optical Network/Synchronous Digital Hierarchy (SONET/SDH) edge nodes for efficient traffic flow control, the method comprising:

encapsulating packet payloads into SONET/SDH containers using a Generic Framing Procedure (GFP) protocol;

dividing the SONET/SDH containers into Virtual Containers (VCs) that are part of a Virtual Concatenated Groups (VCG) using a Virtual Concatenation (VCAT) protocol;

hitlessly, dynamically, and selectively adding/removing members to/from the VCG using the LCAS signaling protocol;

monitoring the operational condition of and selectively assigning a state to time-slots associated with the VCG and one or more diverse routes using a Time-Slot Manager; and providing an interface for users to specify the VCG in terms of time-slots and communicating time-slot changes between the Time-Slot Manager and the LCAS signaling protocol using a VCG Manager;

wherein the Time-Slot Manager manages all of the time-slots, and wherein the Time Slot Manager provides an interface to the high-level applications thereby making VCG and LCAS operations transparent to the high-level applications.

2. The method of claim 1, wherein the state assigned to each of the time-slots by the Time-Slot Manager comprises one of:

IDLE—the time-slot has not been defined by hardware, HOLD—the time-slot is in the process of being initiated by an application, READY—the time-slot is ready to be used, or ACTIVE—the time-slot is operational and passing traffic.

3. The method of claim 1, wherein communicating time-slot changes between the Time-Slot Manager and the LCAS signaling protocol comprises assigning a state to the VCG Manager for each time-slot managed.

4. The method of claim 3, wherein the state assigned to the VCG Manager for each time-slot managed comprises one of:

IDLE—the time-slot has not been initiated in the Time-Slot Manager yet, HOLD—the time-slot is in process with the Time-Slot Manager, READY—the time-slot has been activated in the Time-Slot Manager and can begin to transport data, or ACTIVE—the data plane is sending data within the time-slot and LCAS is up-and-running.

5. The method of claim 4, wherein, when a route has been successfully established, the Time-Slot Manager assigns the ACTIVE state to all of the corresponding time-slots and communicates any changes to the VCG Manager.

6. The method of claim 5, wherein, upon receiving the communication from the Time-Slot Manager, the VCG Manager is assigned the READY state for each of the corresponding time-slots.

7. The method of claim 6, wherein, if there is no failure of a data plane, the VCG Manager sends new members to the data plane for the LCAS signaling protocol to operate and the VCG Manager is assigned the ACTIVE state for each of the corresponding time-slots.

8. The method of claim 6, wherein, if there is a failure of a data plane, the VCG Manager is assigned the READY state for each of the corresponding time-slots.

9. The method of claim 4, wherein, when a route has been successfully deleted, the Time-Slot Manager communicates any changes to the VCG Manager, the VCG Manager is assigned the IDLE state for each of the corresponding time-slots, and the LCAS signaling protocol is informed to shut down traffic on the time-slots.

10. The method of claim 1, further comprising generating a request to suspend traffic on selected time-slots using the application, receiving the request on the Time-Slot Manager, relaying the request to the VCG Manager, and informing a data plane to trigger the LCAS signaling protocol to shut down traffic on both ends of a connection, wherein the LCAS signaling protocol is used to perform a bi-directional shut-down through a fake time-slot outage.

11. The method of claim 10, wherein a source node triggers an LCAS IDLE operation to suspend traffic in one direction and operators trigger the LCAS IDLE operation on a sink node to suspend traffic in another direction.

12. The method of claim 11, further comprising sending an MST=Fail message from the source node to the sink node to inform the sink node that a given time-slot is down and receiving an LCAS DNU (Do-Not-Use) message at the source node from the sink node.

13. A method for interfacing high-layer applications to a Link Capacity Adjustment Scheme (LCAS) signaling protocol on Synchronous Optical Network/Synchronous Digital Hierarchy (SONET/SDH) edge nodes for efficient traffic flow control, the method comprising:

encapsulating packet payloads into SONET/SDH containers using a Generic Framing Procedure (GFP) protocol;
   dividing the SONET/SDH containers into Virtual Containers (VCs) that are part of a Virtual Concatenated Groups (VCG) using a Virtual Concatenation (VCAT) protocol;
   hitlessly, dynamically, and selectively adding/removing members to/from the VCG using the LCAS signaling protocol; monitoring the operational condition of and selectively assigning a state to time-slots associated with the VCG and one or more diverse routes using a Time-Slot Manager;
   providing an interface for users to specify the VCG in terms of time-slots and communicating time-slot changes between the Time-Slot Manager and the LCAS signaling protocol using a VCG Manager;
   generating a request to suspend traffic on selected time-slots using the application;
   receiving the request on the Time-Slot Manager;
   relaying the request to the VCG Manager; and
   informing a data plane to trigger the LCAS signaling protocol to shut down traffic on multiple directions;
   wherein the Time-Slot Manager manages all of the time-slots, and wherein the Time Slot Manager provides an interface to the high-level applications thereby making VCG and LCAS operations transparent to the high-level applications.

14. An apparatus for interfacing high-layer applications to a Link Capacity Adjustment Scheme (LCAS) signaling protocol on Synchronous Optical Network/Synchronous Digital Hierarchy (SONET/SDH) edge nodes for efficient traffic flow control, the apparatus comprising:

> a Generic Framing Procedure (GFP) protocol for encapsulating packet payloads into SONET/SDH containers;
>
> a Virtual Concatenation (VCAT) protocol for dividing the SONET/SDH containers into Virtual Containers (VCs) that are part of a Virtual Concatenated Groups (VCG);
>
> the LCAS signaling protocol for hitlessly, dynamically, and selectively adding/removing members to/from the VCG;
>
> a Time-Slot manager for monitoring the operational condition of and selectively assigning a state to time-slots associated with the VCG and one or more diverse routes; and
>
> a VCG Manager for providing an interface for users to specify the VCG in terms of time-slots and communicating time-slot changes between the Time-Slot Manager and the LCAS signaling protocol;
>
> wherein the Time-Slot Manager manages all of the time-slots, and wherein the Time Slot Manager provides an interface to the high-level applications thereby making VCG and LCAS operations transparent to the high-level applications.

15. The apparatus of claim 14, wherein the state assigned to each of the time-slots by the Time-Slot Manager comprises one of: IDLE—the time-slot has not been defined by hardware, HOLD—the time-slot is in the process of being initiated by an application, READY—the time-slot is ready to be used, or ACTIVE—the time-slot is operational and passing traffic.

16. The apparatus of claim 14, wherein communicating time-slot changes between the Time-Slot Manager and the LCAS signaling protocol comprises assigning a state to the VCG Manager for each time-slot managed.

17. The apparatus of claim 16, wherein the state assigned to the VCG Manager for each time-slot managed comprises one of:

> IDLE—the time-slot has not been initiated in the Time-Slot Manager yet, HOLD—the time-slot is in process with the Time-Slot Manager, READY—the time-slot has been activated in the Time-Slot Manager and can begin to transport data, or ACTIVE—the data plane is sending data within the time-slot and LCAS is up-and-running.

18. The apparatus of claim 17, wherein, when a route has been successfully established, the Time-Slot Manager assigns the ACTIVE state to all of the corresponding time-slots and communicates any changes to the VCG Manager.

19. The apparatus of claim 18, wherein, upon receiving the communication from the Time-Slot Manager, the VCG Manager is assigned the READY state for each of the corresponding time-slots.

20. The apparatus of claim 19, wherein, if there is no failure of a data plane, the VCG Manager sends new members to the data plane for the LCAS signaling protocol to operate and the VCG Manager is assigned the ACTIVE state for each of the corresponding time-slots.

21. The apparatus of claim 19, wherein, if there is a failure of the data plane, the VCG Manager is assigned the READY state for each of the corresponding time-slots.

22. The apparatus of claim 17, wherein, when a route has been successfully deleted, the Time-Slot Manager communicates any changes to the VCG Manager, the VCG Manager is assigned the IDLE state for each of the corresponding time-slots, and the LCAS signaling protocol is informed to shut down traffic on the time-slots.

23. The apparatus of claim 14, further comprising the application for generating a request to suspend traffic on selected time-slots, the Time-Slot Manager for receiving the request and relaying the request to the VCG Manager, and the VCG Manager for informing a data plane to trigger the LCAS signaling protocol to shut down traffic on both ends of a connection, wherein the LCAS signaling protocol is used to perform a bi-directional shutdown through a fake time-slot outage.

24. The apparatus of claim 23, wherein a source node triggers an LCAS IDLE operation to suspend traffic in one direction and operators trigger the LCAS IDLE operation on a sink node to suspend traffic in another direction.

25. The apparatus of claim 24, further comprising means for sending an MST=Fail message from the source node to the sink node to inform the sink node that a given time-slot is down and receiving an LCAS DNU (Do-Not-Use) message at the source node from the sink node.

* * * * *